United States Patent [19]

Hujink

[11] Patent Number: 5,181,786
[45] Date of Patent: Jan. 26, 1993

[54] METHOD AND APPARATUS FOR PRODUCING ADMISSION TICKETS

[75] Inventor: Hendrik W. Hujink, Aalten, Netherlands

[73] Assignee: N.V. Nederlandsche Apparatenfabriek Nedap, De Groenlo, Netherlands

[21] Appl. No.: 612,697

[22] Filed: Nov. 15, 1990

[30] Foreign Application Priority Data

Nov. 15, 1989 [NL] Netherlands ............ 8902818

[51] Int. Cl.⁵ ............ B41J 5/30; B42D 15/10
[52] U.S. Cl. ............ 400/61; 283/94; 283/108; 283/75; 354/75; 156/499; 156/364; 358/467; 355/40; 382/2; 380/23
[58] Field of Search ............ 400/61, 62; 156/555, 156/499, 364, 241, 247; 235/487; 354/109, 75, 85, 86, 87; 283/94, 17, 108, 75; 358/467; 380/23; 382/2; 355/40

[56] References Cited

U.S. PATENT DOCUMENTS

| | | | |
|---|---|---|---|
| 3,415,706 | 12/1968 | Ettre | 156/555 X |
| 3,421,966 | 1/1969 | McLaughlin | 156/555 |
| 3,438,835 | 4/1969 | Chen | 156/555 X |
| 3,453,165 | 7/1969 | Isbey | 156/555 X |
| 3,453,169 | 7/1969 | Buck | 156/555 X |
| 3,623,933 | 11/1971 | Staats | 156/555 X |
| 3,720,564 | 3/1973 | Staats | 156/499 |
| 3,725,647 | 4/1973 | Retzky | 235/487 |
| 3,843,483 | 10/1974 | Sendor | 156/555 X |
| 3,855,033 | 12/1974 | Staats | 156/220 |
| 3,901,758 | 8/1975 | Humphries | 156/555 X |
| 3,932,036 | 1/1976 | Ueda | 355/40 |
| 4,056,422 | 11/1977 | Staats | 156/309 |
| 4,158,587 | 6/1979 | Keller | 156/216 |
| 4,252,427 | 2/1981 | Brecht | 354/109 |
| 4,252,598 | 2/1981 | Bachelder | 156/364 X |
| 4,376,006 | 3/1983 | Nishikawa | 156/233 |
| 4,464,221 | 8/1984 | Garber | 156/555 X |
| 4,544,184 | 10/1985 | Freund | 283/94 |
| 4,544,590 | 10/1985 | Egan | 156/241 X |

(List continued on next page.)

FOREIGN PATENT DOCUMENTS

| | | |
|---|---|---|
| 0084064 | 12/1981 | European Pat. Off. . |
| 57080 | 8/1982 | European Pat. Off. ............ 400/61 |
| 0210963 | 7/1986 | European Pat. Off. . |
| 3420428 | 6/1984 | Fed. Rep. of Germany . |
| 2605935 | 10/1986 | France . |

(List continued on next page.)

OTHER PUBLICATIONS

IBM Technical Disclosure Bulletin, F.C. Parry, Nov. 6, 1960, vol. 3, No. 6, "Identification Card".

Primary Examiner—Edgar S. Burr
Assistant Examiner—Eric Raciti
Attorney, Agent, or Firm—Jacobson, Price, Holman & Stern

[57] ABSTRACT

Method and apparatus for producing admission tickets that feature electromagnetically stored and detectable information and also visual information that contains, at least partly, identification data of the holder of the admission ticket, wherein the electromagnetically detectable information and the visual information is provided on separate carriers and wherein the separate carriers are placed in an, at least, partly transparent completely sealed sleeve. Admission tickets (14'') are produced by a central processing unit (1), a video camera (2) linked with the central processing unit, and a dispenser (3) linked with the central processing unit. The dispenser has a printer for printing an image, recorded by the video camera (2), on a suitable carrier (17), which image has been converted by the central processing unit (1) into electric control signals. A magazine (4) holes a number of electromagnetically programmable responders (14), and a programming device is controlled by the processing unit (1). The dispenser (3) further places a transparent, completely sealed sleeve (8, 30) around a responder (14) and a carrier (17) featuring a printed image together.

15 Claims, 2 Drawing Sheets

U.S. PATENT DOCUMENTS

| | | | |
|---|---|---|---|
| 4,554,591 | 11/1985 | Kee | 358/467 |
| 4,560,426 | 12/1985 | Moraw | 156/64 |
| 4,568,403 | 2/1986 | Egan | 156/247 |
| 4,619,728 | 10/1986 | Brink | 156/555 |
| 4,687,526 | 8/1987 | Wilfert | 283/108 X |
| 4,712,909 | 12/1987 | Oshikoshi | 354/109 X |
| 4,862,200 | 8/1989 | Hicks | 354/75 |
| 4,921,278 | 5/1990 | Shiang | 283/17 |
| 4,993,068 | 2/1991 | Piosenka | 380/23 |
| 5,042,078 | 8/1991 | Oshikoshi | 382/54 |
| 5,067,835 | 11/1991 | Yamamoto | 355/40 X |
| 5,068,742 | 11/1991 | Oshikoshi | 358/296 |

FOREIGN PATENT DOCUMENTS

| | | | |
|---|---|---|---|
| 147673 | 12/1986 | Japan | 400/61 |
| 2134848 | 8/1984 | United Kingdom . | |
| 2143980 | 2/1985 | United Kingdom . | |
| 2191029 | 12/1987 | United Kingdom . | |
| WO82/04149 | 11/1982 | World Int. Prop. O. . | |
| WO88/03295 | 5/1988 | World Int. Prop. O. . | |
| WO89/00741 | 1/1989 | World Int. Prop. O. . | |

METHOD AND APPARATUS FOR PRODUCING ADMISSION TICKETS

The invention relates to a process and apparatus for producing admission tickets featuring electromagnetically stored and detectable information and also visual information that, at least partly, contains identification data of the holder of the admission ticket.

Nowadays, there are numerous systems to admit persons to one or more places, facilities, areas, events, etc. A traditional way is selling admission tickets at a cash desk. The procedure for buying an admission ticket starts with the prospective buyer expressing the wish that a ticket is desired. Using the buyer's information the cashier determines the type of ticket and also in some cases the category under which the prospective buyer comes. The amount payable is then determined. After payment the admission ticket is issued. The usual manner of issuing admission tickets has some drawbacks. The manual issue of admission tickets is relatively labor intensive. Furthermore, this form of issue does not involve any link between the admission ticket and the person admitted. Another known way of issuing admission tickets is, for example, the issue of admission tickets in the form of magnetic cards. These are card shaped carriers featuring a strip of magnetic material. At the cash desk the category of admission tickets for which the prospective buyer is eligible, is determined. When the category has been determined the admission price is fixed. As a magnetic card is used for the admission tickets, information in digital form can be stored in the magnetized material of the card. Settlement systems using magnetic cards usually store information in the card that relates to the conditions on which one is admitted to one or more attractions, facilities, events, etc. These conditions may concern, for example, a certain time duration, a predetermined area and the like, and can be electronically read and verified.

The issue of admission tickets in the form of magnet cards also has drawbacks. Such cards are not altogether protected against fraudulent use. For example, the use of a lost or transferred ticket by an unauthorized user. For this purpose one or more characteristics of the person admitted should be linked to the admission ticket. Establishing a visual link between the admission ticket and the person admitted is sometimes effected by placing a signature or even a picture of the person admitted onto the admission ticket. However, in this way a relatively labor intensive action is still needed for issuing a ticket. Using a picture of the holder of the ticket, a photograph or the like should first be made and then stapled or stuck to the ticket. An example of a ticket that features electromagnetically stored information as well as visual information is the familiar cheque guarantee card with PIN code. A cheque guarantee card allows access to certain facilities, such as, a cash dispenser, and can therefore be considered as a permanent admission ticket. A cheque guarantee card contains information stored in a magnetic strip, and, furthermore, features alphanumeric information whether or not in relief. Often, the cheque guarantee card also features a signature that is protected by a transparent, permanent, protective layer. Also some credit cards feature electromagnetically stored information. The use of such a kind of card as an occasionally valid admission ticket has its drawbacks. It is possible, indeed, to automatically effect certain payments, for example, for the number of times a certain facility, such as, a ski-lift, is used, but a visual check on the use of a ticket by the correct person is only possible by having the person concerned place a confirming signature. Furthermore, the reuse of such a card is not possible. Also, it is hardly possible to immediately produce such a card at a cash desk. From European patent 0084064 a method and apparatus is known for automatically producing ski-passes, i.e., admission tickets, for ski areas, whereby the picture of the card holder is printed, by means of a thermo print head, on a card featuring a thermo sensitive layer. The thermo print head is controlled by an apparatus that can convert video images into digital signals, and that is connected with a video camera installed on the spot. This known ski-pass allows for a simple visual check. However, the known card does not contain any electromagnetically stored information and cannot therefore be used for automatically paying for, for example, the number of times a ski lift has been used, or, for example, the admission price, for a certain sector and the like. Neither is this known card suitable for reuse. The result is that a great number of cards must be destroyed after their use, and that cards are thrown away thus spoiling the environment.

BRIEF SUMMARY OF THE INVENTION

It is an object of the invention to eliminate the listed drawbacks and to provide, in general, a method and apparatus with which an admission ticket can be produced in a relatively simple and cheap manner, that can be used in many situations and that is suitable for electronic verification and payment allowing in a simple manner a visual check and being suitable, if so desired, for reuse.

According to the invention a method of the kind described above is characterized in that for the electromagnetically detectable information and the visual information separate carriers are used and that the separate carriers together are placed in an at least partly, transparent sleeve that is sealed on all sides.

According to the invention an apparatus for producing admission tickets that feature electromagnetically stored and detectable information and also visual information that, at least partly, contains identification data of the holder of the admission ticket, is characterized by a central processing unit; a video camera linked with the central processing unit; and a dispenser means linked with the central processing unit, the dispenser means comprising a printer for printing on a suitable carrier an image recorded by the video camera which image is converted by the central processing unit into electric control signals, wherein said dispenser means further comprises a magazine containing a number of electromagnetically programmable responders, and a programming device controlled by the processing unit, and wherein the dispenser means further comprises an apparatus for providing a transparent and sealed sleeve around a responder and a carrier with a printed image together.

BRIEF DESCRIPTION OF THE DRAWINGS

The invention will now be further described by way of example, with reference to the accompanying drawings, wherein.

DETAILED DESCRIPTION

Figure 1:
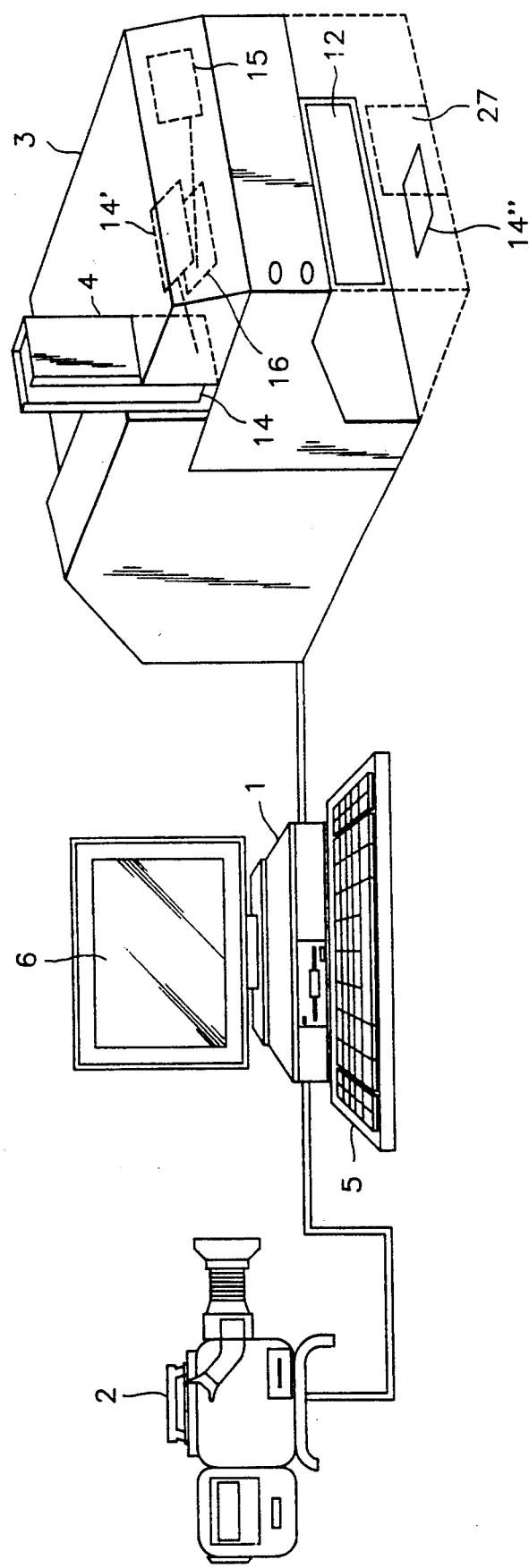
FIG. 1 is an elevational view which schematically shows an embodiment of an apparatus for producing admission tickets according to the invention.

The apparatus shown in FIG. 1 includes a central processing unit 1, means 2 for establishing the link between the admission ticket and the person admitted, and a dispenser means 3. The central processing unit 1 that may comprise a minicomputer, for example, is operated on software through which a printer can be controlled. Information about the available admission tickets and the related rates are stored in the memory of the minicomputer. The operator of the apparatus can give instructions via the software with the aid of a keyboard 5.

In order to enhance the user-friendliness a so-called mouse can also be used. By means of the keyboard or the mouse instructions and actions that have to take place at the cash desk can be simply indicated and inputted via the viewing screen. When a customer wishes to have access to a certain facility the required type of admission ticket can be indicated on the viewing screen with the mouse. After this instruction has been given the admission ticket is prepared and issued by the dispenser. On the screen it is indicated, possibly in various currencies, how much should be paid for the admission ticket. The collected amount is registered.

Apart from that the processing unit may register the type of admission ticket, the time when and the cash desk at which the ticket has been issued. Should this be necessary for a specific application then additional data may also be gathered. The admission ticket is produced by means of a dispenser connected with the computer. When the operator of the computer instructs that a certain type of admission ticket should be issued, an admission ticket is produced by the dispenser. In this admission ticket all characteristic information related to the chosen type, which information also originates from a minicomputer, is registered electronically. For that purpose the admission ticket preferably involves a card shaped responder with an electronic circuitry with integrated circuits. The circuitry may, for example, feature a resonance circuit and an encoding circuit as described in the applicant's Dutch patent 176404. The circuit of the responder may contain a predetermined unique code that is generated by the circuitry of the responder if the responder is present in a suitable interrogation field, and may be read in a contactless manner and thus at a distance. Preferably, a reprogrammable circuitry is used that can be reprogrammed after use with another code and is thus suitable for reuse. Such a responder has been described, for example, in the applicant's Dutch patent application 8601021. For reading as well as programming such a responder a transmitter/receiver is needed that generates an electromagnetic interrogation field. When the card shaped responder is positioned in this interrogation field the circuitry of the responder can, by inductive coupling between the transmitter coil and the coil of the responder, be provided with an electric supply voltage and the information stored in the responder can, possibly in encoded form, be transmitted to the transmitter/receiver via the same interrogation field. The information in the responder may, for example be reprogrammed in a manner described in the Dutch patent application 8601021 by modulating the interrogation field provided by the transmitter/receiver with the information to be transferred to the ticket. The Dutch patent application is incorporated herein by reference.

The dispenser contains a programming module, for example in the form of a transmitter/receiver as described above, that programs, preferably in a contactless manner, the card shaped responder of the admission ticket to be issued using the information originating from the computer as intended for this type of ticket. Depending on the application various types of infomation may be stored.

Usually, a unique code, for example, a number, and the technical data that are of importance for verification and the tracing of the admission ticket at the various admission and/or check points, are stored. Furthermore, the ticket may contain information about the duration of validity, the permitted area, the number of times one may have access, place of issue and admission price, etc. If the admission or check points are equipped with reprogramming apparatus that can, for example, change the residual value of the card shaped responder then it is not strictly necessary to provide the responder with a unique identification code. The minicomputer is linked with a device that establishes a certain link between the person admitted and the admission ticket itself. As shown in FIG. 1 this device is, for example, a video camera 2 that takes a picture of the face of the future holder of the admission ticket.

As an alternative the link could be established by recording a signature whereby the graphic image of the signature is stored in the responder in digital form, of a fingerprint of the cardholder whereby the imprint of the finger is composed by means of, for example, ultrasound, which imprint may also be stored in the responder of the admission ticket. The use of an image of the person admitted offers the simplest possibility for a visual check. In that case, on purchasing an admission ticket a picture of the customer is taken by the operator with the aid of the video camera. The video camera is operated by the operator with the aid of the minicomputer. The operator may see, and if so required, adapt and/or enhance the recorded picture on his screen thus optimizing the image to be printed. When the required image has been obtained it is printed on paper by means of a suitable printer, for example, a thermoprinter that is incorporated in the dispenser 3. Apart from the image the data relevant to a certain application, for example, the unique responder code or the area for which the admission ticket is valid can, moreover, be printed. For the sake of efficiency in the embodiment shown in FIG. 2, printing of the image and the programming of the responder preferably take place simultaneously. Joining the print and the responder, that is preferably card shaped, takes place in such a manner that fraudulent actions with the purpose of changing the image are virtually impossible without physical damage.

Figure 2:
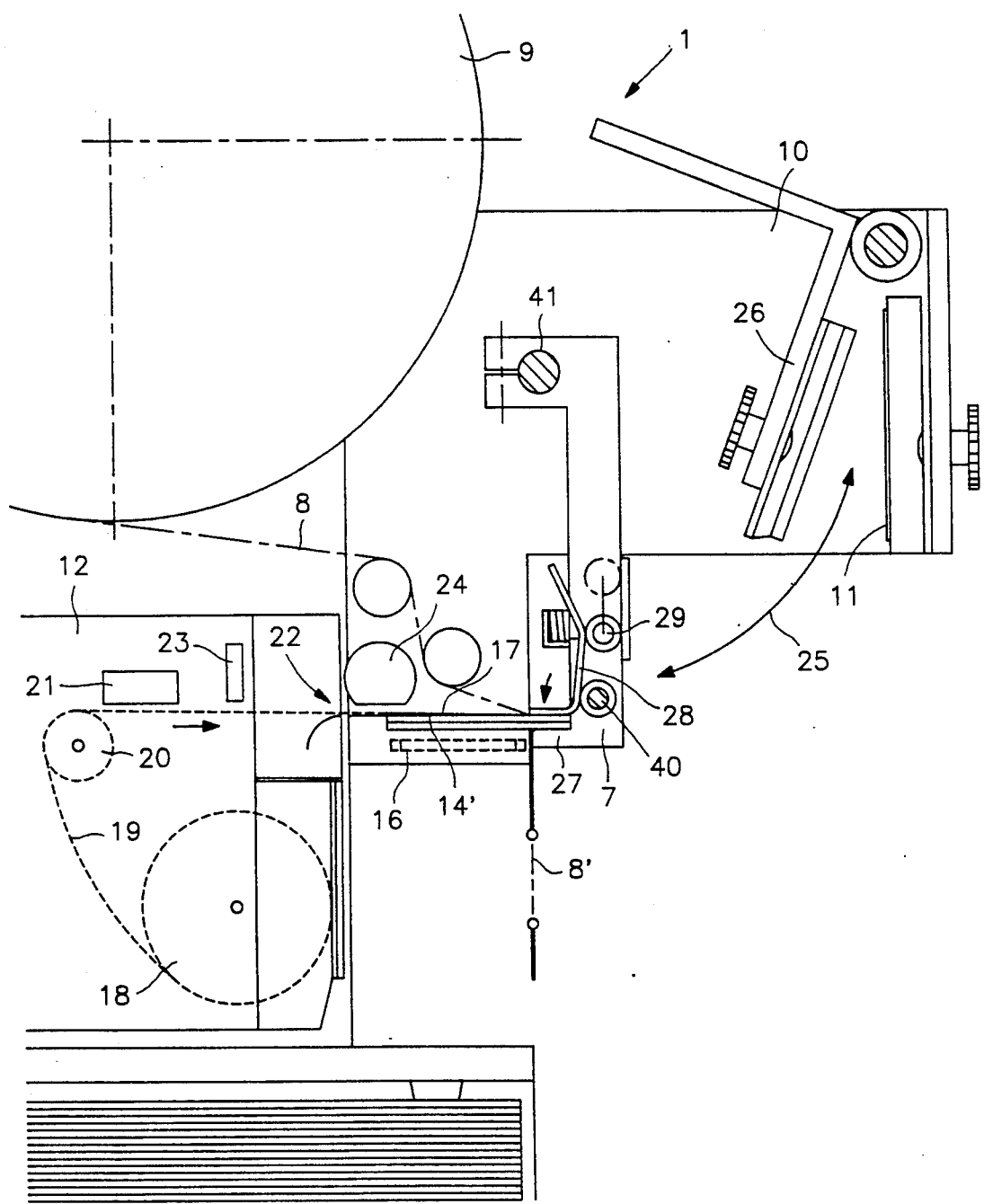
FIG. 2 is a cross-sectional view which schematically shows part of the apparatus of FIG. 1.

According to the invention, joining takes place by packaging the responder card and the picture together. As per FIG. 2 the card and the printed image are packaged in, for example, a plastic and transparent sleeve. The operation of the dispenser as per FIG. 2 will now be described. The printer 12 incorporated in the dispenser under the control of the processing unit prints the image, made with camera 2 and possibly further enhanced and/or adapted with the aid of the processing unit, and other specific information. At the same time the processing unit transmits data to the transmitter/receiver (not shown) of the dispenser 3. A magazine 4 holds a stack of responder cards 14 that, in the example to be described, already feature a preprogrammed code to identify each card. After receiving a corresponding command one card 14 is released for programming, followed by such a positioning that programming via a transmitter/receiver is possible. The programming position is indicated in FIG. 1 and FIG. 2 at 14'. The transmitter/receiver is indicated with broken lines at 15 and the antenna coil of the transmitter/receiver has been shown at 16. Before programming the card is electronically checked for readability. This takes place by reading the preprogrammed unique code of the card. If the admission ticket is intended for use in an automatic settlement system whereby a value, assigned to the admission ticket on issue, is reduced until the admission ticket has no more any value and is thus invalid, then the code together with any other information can be stored in a memory of the processing unit. The programming cycle takes approximately 3 seconds. During this time the printer 12 provides a sheet on which the image of the customer concerned is printed and feeds it to the admission ticket 14. The printer can be a normal commercially available printer.

FIG. 2 schematically shows a paper roll 10. The paper 19 is fed via one or more rolls past a printing station 21 to an exit 22 and is automatically cut to size at 23. In front of the exit 22 a card 14 lays ready.

Furthermore, a conveyor roller 24 transports the printed sheet until it lies on the card 14. The transparent material 8, for example, plastic foil, is manually supplied when the first admission ticket is issued. A certain quantity of foil is extracted from a roller 9 such as to cover the already positioned card. The foil is supplied over the upper side of the card on which the carrier 17 with the image is positioned.

When the supply stops the foil covers the combination of printed sheet and card and hangs down over the combination as shown at 8'. As soon as the programming cycle ends and the carrier printed with the image is on the upper side of the card, a sealing plier device 7 incorporated in the dispenser 1 is moved from the repose position to the combination of card and sheet, as indicated with an arrow 25. During the last part of the movement the sealing pliers pulls along the foil thus partly enveloping the card and printed sheet at the top and bottom because the foil is folded around the card and the sheet as a result of a pincer movement made by a fixed jaw 27 and a moving jaw 28, which under the control of a movable cam 29 can rotate around a shaft 40.

Afterwards the sealing pliers 7, together with card, picture and sealing material is moved back to seal head 10. During that movement the sealing pliers extract the exact quantity of foil material from roller 9 that is necessary for packaging the next admission ticket. Seal head 10 incorporates a press-on device 26 and a sealing wire 11 that can be a resistance wire. The sealing wire envelops the admission ticket on three sides. Due to heating the material at the contour of the card is somewhat melted, and the two foil layers are joined together along the edges. After proper sealing has been achieved the sealing wire 11 cuts off any residual material. The admission ticket is now completely enveloped and packaged in a transparent material. After a relatively short cooling off period the sealing pliers are opened making the admission ticket available for issue. The admission ticket can, for example, drop from the seal head 10 to position 14" that is accessible via an opening 27 (FIG. 1). The card 14 can be a magnetic card but also an electronic responder card as described above. An electronic responder card affords the possibility to read the information stored in the card at a distance handsfree. For a number of applications, such as, for example, a ski-pass, this is of great importance. The drawback in that a responder card is relatively expensive can be offset by using a reprogrammable responder circuitry that can be used again.

When the admission ticket has become invalid because the period of validity, for example, has expired, or the paid and programmed amount has been expended, the responder can be reprogrammed at a cash desk for reuse by the same or another user. In the latter case a new picture will have to be provided. This can be simply done by cutting the plastic sleeve open and removing the sheet featuring the image. In the manner described above the card can then be reprogrammed and provided with a new picture and sleeve. It should be noted that this is also possible if magnetic cards are used. Neither the card nor the picture are soiled or become dirty because of the protective sleeve thus making reuse possible.

Figure 3:
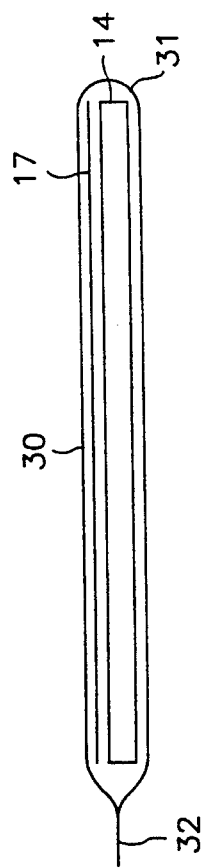
FIG. 3 schematically shows a sectional view of an admission ticket according to the invention.

For the sake of completeness, FIG. 3 shows a sectional view of an admission ticket according to the invention, comprising a card 14, a carrier 17 with a picture, and a sleeve made of foil 30, which sleeve is wrapped around the combination of card and carrier, as indicated at 31, and is sealed at 32. It should be noted that an admission ticket or pass according to the invention can be applied in many situations and in many ways. An example is a season ticket to attend soccer games. The card can then be programmed such that the admission ticket will only be valid during a predetermined season. The image of the holder of the admission ticket may possibly also feature a color that is only valid for the season concerned. If the card is reprogrammable it can be rendered reusable for a new season. The image can then be produced again in another color.

It is also possible to make the admission ticket valid for only a predetermined number of games. When purchasing such a card, for instance, five games are paid for in advance and on attending a game the card is read and the validity of the admission ticket is adjusted when the admission ticket is shown at a check point. Adjusting the validity is possible by adjusting data stored in the central processing unit, and/or adjusting the memory of the card itself.

With the aid of the admission tickets according to the invention a completely automatic settlement system can thus be achieved.

Numerous other applications, such as, for example, public transport, exhibitions, fair grounds, subscriber's tickets for cinemas, etc. are possible. The ski-pass was already mentioned.

In ski areas it often happens that the various ski lifts are operated by various operators. If an admission ticket according to the invention is used for the total ski area, each ski lift may be equipped with a transmitter/receiver that automatically recognizes the responder card by means of the related code. The fact that a certain ski lift was used allowing access with the admission ticket can then be registered providing the possibility to allocate a certain portion of the total receipts to certain operators. Of course, the same applies to other similar situations, such as, for example, fair grounds with various attractions offered by various operators, or public transport in which various operating companies are active. It should be noted that various modifications of the procedure and apparatus as described are possible. Thus, the image can be printed on a suitable carrier other than paper. It is also possible to position the carrier of the image under instead of on top of the responder card. The carrier with the image can also be folded around the responder card. These and similar modifications are deemed to be within the scope of the present invention.

I claim:

1. Method for producing admission tickets having electromagnetically stored and detectable information and visual information thereon containing identification data of the holder of the admission ticket, comprising:
   providing a first carrier containing electromagnetically detectable information;
   providing a second carrier containing visual information;
   placing said first and second carriers together in overlying unbonded relationship;
   placing an at least partly transparent sleeve element around said overlying carriers in unbonded relationship therewith; and
   sealing said transparent sleeve to completely enclose said overlying carriers, so that said transparent sleeve is removable to facilitate modification of at least one of said carriers and reuse thereof by resealing said first and second carriers in another of said transparent sleeve elements.

2. Method as claimed in claim 1 and further comprising:
   producing a picture of the holder of the admission ticket with a video camera;
   printing said picture on said second carrier by a printer controlled by said video camera to provide said visual information; and
   sealing said transparent sleeve only at edges thereof adjacent edges of at least one of said first and second carriers.

3. Method as claimed in claim 1 and further comprising:
   printing said visual information on a sheet of paper comprising said second carrier; and
   providing dimensions of said second carrier substantially corresponding with the dimensions of said first carrier.

4. Method as claimed in claim 1 wherein said step of enclosing said carriers in said transparent sleeve comprises:
   providing a transparent plastic foil;
   folding a part of said transparent plastic foil around said overlying carriers; and
   sealing said foil along the edges thereof.

5. Method as claimed in claim 1 wherein: said first carrier comprises a magnetic card.

6. Method as claimed in claim 1 wherein: said first carrier comprises a contactless readable responder.

7. Method as claimed in claim 6 wherein: said responder comprises a reprogrammable responder.

8. Method as claimed in claim 6 and further comprising: shaping said responder in the shape of a card.

9. Method as claimed in claim 1 and further comprising:
   providing an identification code in said electromagnetically detectable information on said first carrier for identifying said second carrier.

10. Method as claimed in claim 1 and further comprising:
    providing data relating to validity of the admission ticket in said electromagnetically detectable information on said first carrier.

11. Method as claimed in claim 1 and further comprising:
    positioning said overlying carriers as a set at a first station;
    covering said set of carriers with a transparent foil overhanging said carriers along one of the edges of said set;
    gripping said set of carriers and said foil along said one edge of said set of carriers with a gripper;
    folding said overhanging foil around said set of carriers;
    moving said gripper with said set of carriers and foil thereon to a second station;
    sealing said foil along the edges of said set of carriers; and
    cutting off excess foil material around said sealed edges.

12. A method as claimed in claim 11 and further comprising:
    extracting said foil from a roll;
    cutting said foil folded around said set of carriers off said roll; and
    providing a distance between said first station and said second station so that the part of the foil connected with said roll prior to said cutting off the roll has a length sufficient to form a sleeve for a next successive set of carriers.

13. Apparatus for producing admission tickets having electromagnetically stored and detectable information and visual information thereon containing identification data of the holder of the admission ticket, comprising:
    a central processing unit;
    a video camera means connected with said central processing unit;
    a dispenser means connected with said central processing unit;
    a printer in said dispenser means for printing on a first carrier an image recorded by said video camera, which image is converted by aid central processing unit into electric control signals;
    a magazine on said dispenser means for containing a plurality of electromagnetically programmable responders;
    a programming device controlled by said central processing unit for electromagnetically programming said responders;
    means in said dispenser means for positioning said carrier and one of said responders together in overlying unbonded relationship;
    means in said dispenser means for providing a transparent sleeve around said overlying carrier and responder in unbonded relationship thereto; and
    means in said dispenser means for sealing said transparent sleeve around said overlying carrier and responder in unbonded relationship thereto, so that said transparent sleeve is removable to facilitate modification of at least one of said carriers and reuse thereof by resealing said first and second carriers in another of said transparent sleeve elements.

14. Apparatus as claimed in claim 13, wherein:
    each responder has the shape of a card;
    said first carrier has dimensions corresponding with the dimensions of said card;

said means for positioning said carrier and responder together comprises first means for placing said carrier on said responder;

said means for providing a transparent sleeve comprises a roll of transparent foil and second means for extracting a predetermined length of said transparent foil from said roll and placing said predetermined length of transparent foil over said overlying carrier and responder so that part of said foil overhangs one of the edges of said overlying responder and carrier;

gripper means in said dispenser means for gripping said overlying carrier and responder and said foil at said one edge;

means for transporting said gripper with said overlying responder and carrier and foil therein to a sealing station; and means in said dispenser for sealing open edges of said foil.

15. Apparatus as claimed in claim 14 wherein:

said transporting means moves a predetermined distance between said gripping station and said sealing station corresponding to a predetermined length of foil for forming a sleeve for a next successive overlying carrier and responder.

* * * * *